(No Model.)  2 Sheets—Sheet 1.

A. U. SMITH.
PRICE SCALE.

No. 597,300. Patented Jan. 11, 1898.

WITNESSES
H. A. Lamb.
S. V. Hley.

INVENTOR
Albert U. Smith
By A. M. Wooster, Atty.

(No Model.) 2 Sheets—Sheet 2.

A. U. SMITH.
PRICE SCALE.

No. 597,300. Patented Jan. 11, 1898.

WITNESSES
H. A. Lawitz
S. V. Haley

INVENTOR
Albert U. Smith
By A. M. Wooster Atty.

THE NORRIS PETERS CO., PHOTO-LITHO., WASHINGTON, D. C.

UNITED STATES PATENT OFFICE.

ALBERT U. SMITH, OF SAUGATUCK, CONNECTICUT, ASSIGNOR TO THE E. C. SMITH COMPANY, OF SAME PLACE.

PRICE-SCALE.

SPECIFICATION forming part of Letters Patent No. 597,300, dated January 11, 1898.

Application filed July 30, 1897. Serial No. 646,491. (No model.)

*To all whom it may concern:*

Be it known that I, ALBERT U. SMITH, a citizen of the United States, residing at Saugatuck, in the county of Fairfield and State of Connecticut, have invented certain new and useful Improvements in Price-Scales; and I do hereby declare the following to be a full, clear, and exact description of the invention, such as will enable others skilled in the art to which it appertains to make and use the same.

My present invention relates to an improvement upon the type of scales which automatically compute and indicate both the weight of the merchandise that may be placed in the weighing-pan and the amount to be charged therefor, my improvement being a carrying forward of the principles of operation illustrated and described in my former Letters Patent, reissued April 28, 1896, No. 11,526. As scales of this class have heretofore been constructed in order to enable the purchaser to read the figures upon the drum which indicate the weight of the merchandise in the weighing-pan it has been necessary for him to stand upon the same side of the scale as the dealer, which is of course inconvenient—as, for example, if the scale is used over a counter or table—or else it has been necessary to turn the scale half-way around to enable the purchaser to read the figures.

The object of my present invention, therefore, is to combine with scales of the type referred to certain improvements which will cause the weight of the merchandise in the weighing-pan to be indicated by both sides of the drum and to appear simultaneously on opposite sides of the scale, and, furthermore, to combine with scales of this type certain improvements in the details of construction which will compensate for any uneven stretching of the springs and will render cramping of the parts in use practically impossible, and, furthermore, to combine with scales of this type certain improvements in the details of construction which will limit the upward movement of the draft and rack bars, and thereby stop backward rotation of the drum, but without imparting any appreciable shock to the drum.

With these ends in view my present invention consists in the construction and combination of parts, as hereinafter fully described, and then specifically pointed out in the claims.

Figure 1:
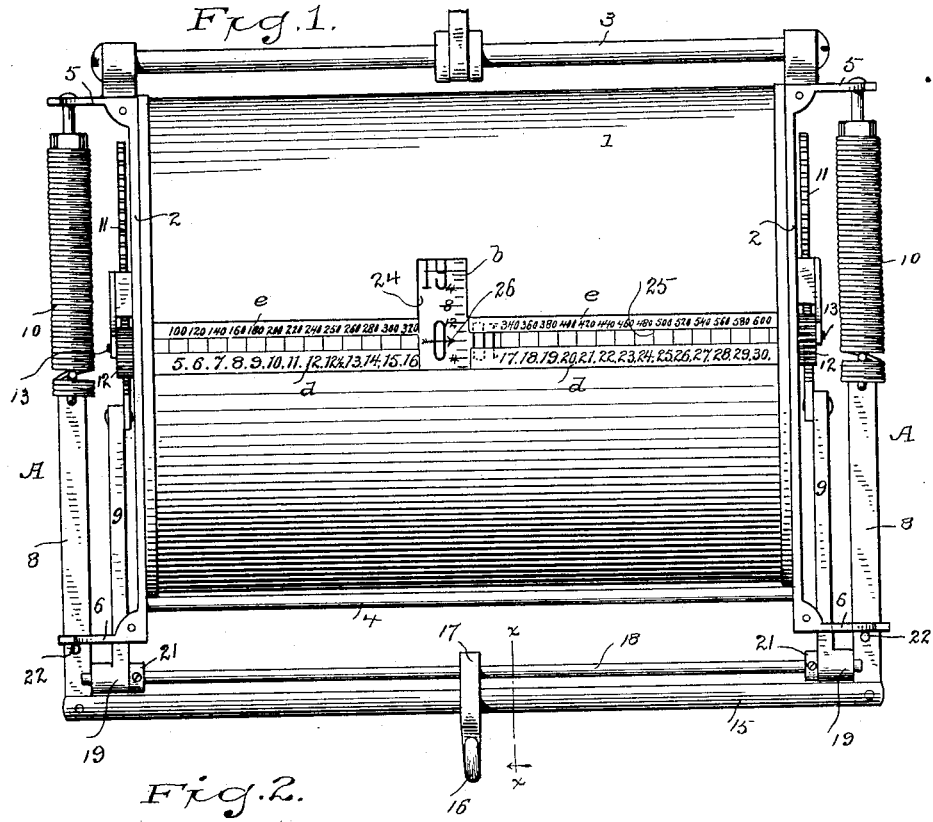
Figure 2:
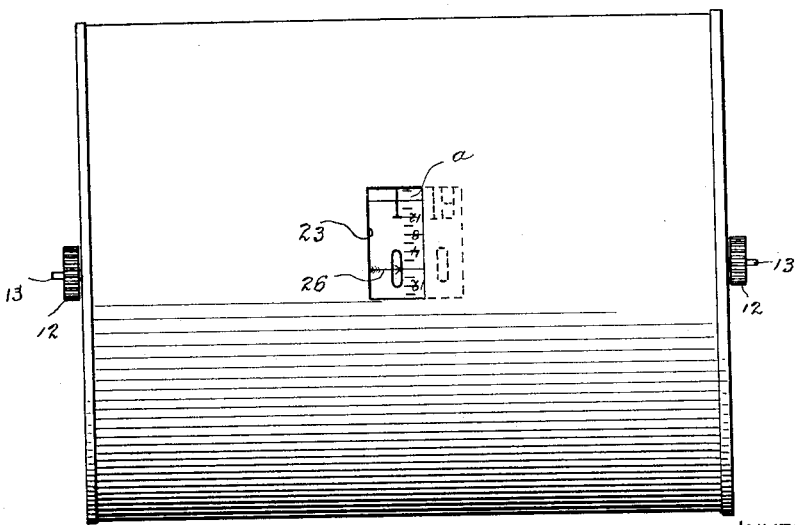
Figure 3:
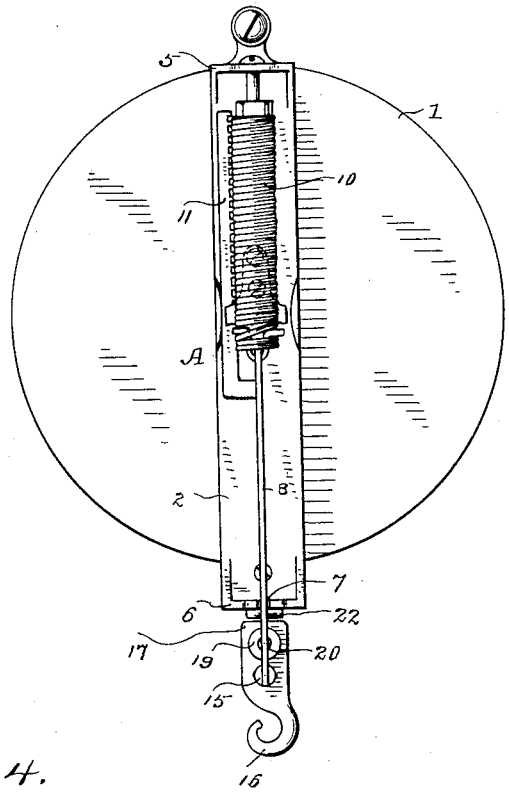
Figure 5:
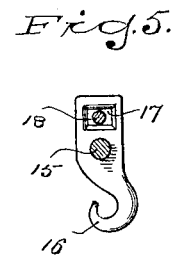
Figure 4:
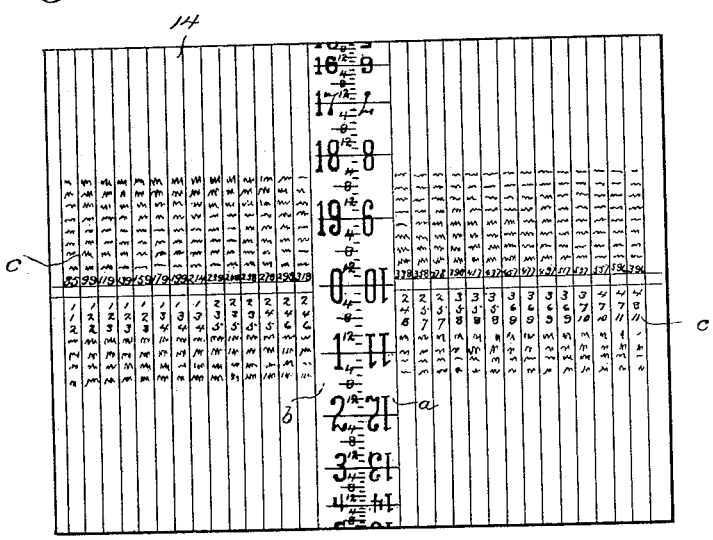

In the accompanying drawings, forming part of this specification, Figure 1 is a front elevation of my novel scale; Fig. 2, a rear elevation of the casing detached; Fig. 3, an end elevation as seen from the left in Fig. 1; Fig. 4, an elevation of the drum detached, and Fig. 5 is a section on the line $x\,x$ in Fig. 1.

1 denotes the casing, which is secured in a suitable frame A, comprising in the present instance uprights 2, connected by a top cross-bar 3 and a bottom cross-bar 4.

5 denotes brackets at the upper ends of the uprights, and 6 brackets at the lower ends of the uprights, said brackets 6 being provided with slots 7, through which the draft-bars 8 and the rack-bars 9 pass freely. The draft-bars are connected to draft-springs 10, the upper ends of said springs being connected to brackets 5, and the upper ends of the rack-bars are provided with or connected to racks 11, which engage pinions 12 upon a drum 14, which in the present instance is shown as carried by a shaft 13, which is journaled in the uprights. The lower ends of the draft-rods are pivoted to an evener 15, at the center of which is rigidly secured a hook 16, to which the weighing-pan (not shown) may be attached.

17 denotes an eye carried centrally by the evener, through which a spring cross-rod 18 passes loosely. In the present instance I have shown the eye and the hook as made integral. It is not material, however, so far as the spirit of my invention is concerned whether the hook and eye are made in one piece or not. The ends of the spring cross-rod pass through sleeves 19 at the lower ends of the rack-bars and are provided at their extreme ends with slots 20, which receive the edges of the draft-bars.

21 denotes collars on the spring cross-rod, which are held in position thereon by set-screws and serve to retain the parts in operative position. It will be noted (see Fig. 5) that the spring cross-rod is loose enough in the eye to permit free movement of the rod. The object of this construction is to permit uneven stretching of the springs without in any way affecting the accuracy of the scales.

In setting up the scales all the springs are the same length, but in use they frequently stretch unevenly. In my present construction it is a matter of no consequence whether the evener is parallel with the spring cross-rod or not. When the weight is applied, if one spring stretches more than the other and if the evener is tilted to a plane out of parallel with the spring cross-rod the pull upon the spring cross-rod exerted by the contents of the weighing-pan will still be central. Consequently there will be no side movement or cramping of any of the parts, and the accuracy of the scale will be in no way affected by the uneven stretching of the springs.

In order to limit the upward movement of the draft and rack bars and stop the backward rotation of the drum when merchandise that has been weighed is removed from the weighing-pan, I provide stop-pins 22 on the draft-bars, which are adapted to engage some fixed portion of the scale (in the present instance brackets 6) to limit the upward movement of the draft-bars, and consequently of the evener, spring cross-rod, and rack-bars, and thereby stop the backward rotation of drum. Owing to the fact, however, that cross-rod 18 is resilient and acts as a spring when the upward movement of the draft-rods is stopped by the engagement of the stop-pins with brackets 6, the upward movement of the rack-bars is not checked instantly and the backward rotation of the drum is stopped yieldingly, thus preventing any appreciable shock or strain upon the frame of the drum.

The drum is preferably of the character described and claimed in my said reissued Letters Patent referred to; but without regard to the construction of the drum itself there is this important difference in the columns of figures thereon: Instead of one column of figures to indicate pounds and ounces, I provide the surface of the drum with two columns of figures to indicate pounds and ounces, said columns reading in opposite directions, as clearly shown in Fig. 4, one of said columns being indicated by $a$ and the other by $b$. These columns may be side by side or separate, as preferred, and may be at the center or either end of the drum, as preferred.

The object in providing two columns of pound and ounce figures running in opposite directions is to enable a purchaser to read the weight of the article in the weighing-pan from the back of the scale. This I accomplish by providing an opening 23 in the back of the casing, (see Fig. 2,) through which one column of figures may be read, (in this instance column $a$,) and by providing an opening 24 in the front of the casing and out of line with opening 23, through which the other column of figures (in the present instance column $b$) may be read. Another important difference is that instead of repeating the figures denoting pounds and adding ounces at each repetition I use relatively large figures, not repeated, to represent pounds and relatively small figures, as "4, 8, 12," to indicate the number of ounces in addition to the number of pounds.

$c$ denotes columns of figures parallel with columns $a$ and $b$ and arranged in alinement therewith which indicate the amount of money to be charged for the merchandise that is being weighed.

25 denotes the usual opening across the front of the casing through which the figures indicating the amount of money to be paid for the merchandise that has been weighed are visible, opening 25 preferably intersecting with opening 24, as shown in Fig. 1. Below opening 25 I provide upon the casing a line of figures designated by $d$, which indicates (in the present instance from "5" to "30") the number of cents per pound to be charged for the merchandise that is being weighed, the operation being as follows: If "9" is the number of pounds indicated at openings 23 and 24 and the price per pound to be charged for the merchandise is eight cents, the user will find "72" indicated in opening 25 just above the figure "8" belonging to the line of figures which I have indicated by $d$.

$e$ is a line of figures above opening 25, which indicates in dollars and cents the amount to be charged for a predetermined number of pounds of merchandise, for example, twenty pounds, as shown in the drawings, at any special price per pound, in the present instance from five to thirty cents per pound. As the number of pounds indicated on the drum in the present instance is "20" and as it is frequently desirable to weigh merchandise running up to more than twenty pounds in weight, it is obvious that after the numerals indicating from "1" to "20" pounds upon the drum have passed the zero-mark "1," "2," "3" pounds, and so on, will be again indicated at opening 24.

To ascertain the amount to be charged for any number of pounds within the capacity of the scale and above twenty, the user adds to the amount indicated in opening 25 the corresponding amount indicated in line $e$ immediately above the amount in column $c$ on the drum which appears at opening 25 immediately above the numeral in line $d$, which indicates the price per pound. Openings 23, 24, and 25 in the casing are in practice covered with glass.

26 denotes characters to denote the zero-point, (in the present instance pointers or arrows,) which are placed upon the glass over openings 23 and 24 at the proper point to register with zero in columns $a$ and $b$, respectively.

Having thus described my invention, I claim—

1. In a scale of the character described, the combination with a casing having openings 23 and 24 in opposite sides thereof, said openings being covered with transparent material having stationary pointers thereon, of a drum adapted to rotate in said casing, racks and springs substantially as specified for rotating said drum, the said drum being provided with two independent columns of figures to indicate pounds and ounces, said columns of figures reading in opposite directions and being visible at openings 23 and 24 respectively, and each of said openings being adapted to permit the reading of the figures in one column only, the pointers on the transparent coverings being so arranged that when one weight is indicated by the pointer at opening 23, the said weight is also indicated by the pointer at opening 24, whereby the two indications correspond with each other.

2. In a scale of the character described, the combination with a casing having openings in opposite sides but not opposite each other, of a revoluble drum provided with a series of columns of figures representing dollars and cents and two independent columns of figures representing weights in pounds and ounces, one column of the latter being arranged to be read from the same side of the casing as the figures representing dollars and cents, and the other column of weight-figures being arranged to be read solely through the opening in the opposite side of the casing, the figures representing dollars and cents not being visible from said opposite side, the openings in the opposite sides of the casing being covered with transparent material having stationary pointers thereon adapted to correspond with each other in their indications of figures so that when the pointer on one side indicates one figure in one column, the other pointer on the other side will indicate exactly the same figure in the other column.

3. In a scale of the character described, the combination with the draft-bars and the rack-bars, of an evener pivoted to the draft-bars and carrying an eye 17 and a cross-rod 18 connected to the rack-bars and passing loosely through the eye, a casing having openings 23 and 24 in opposite sides thereof, a drum having pinions engaging said rack-bars and adapted to rotate in said casing and provided with two independent columns of figures to indicate pounds and ounces, said columns of figures reading in opposite directions and being visible at openings 23 and 24 respectively.

4. In a scale of the character described, the combination with the draft-bars and the rack-bars, of an evener pivoted to the draft-bars and carrying an eye 17 and a cross-rod 18 connected to the rack-bars and passing loosely through the eye, a casing having openings 23, 24, and 25, a drum having pinions engaging said rack-bars and adapted to rotate within the casing and provided with columns of figures to indicate amounts of money which are adapted to register with opening 25 and with two independent columns of figures to indicate pounds and ounces, said two columns of figures reading in opposite directions and one of said columns being visible at opening 23 and the other at opening 24.

5. In a scale of the character described, the combination with the draft-bars and the rack-bars, of an evener pivoted to the draft-bars and carrying an eye 17, and a cross-rod 18 connected to the rack-bars and passing loosely through the eye, a casing having openings 23 and 24 on opposite sides thereof, a drum having pinions engaging the said rack-bars and provided with two independent columns of figures to indicate pounds and ounces, pounds in said columns being indicated by relatively large figures and ounces by relatively small figures, said columns of figures reading in opposite directions and being visible at openings 23 and 24 respectively.

6. In a scale of the character described, the combination with the draft-bars and the rack-bars, of an evener pivoted to the draft-bars and carrying an eye 17 and a cross-rod 18 connected to the rack-bars and passing loosely through the eye, a casing having openings 23 and 24 and 25, and below opening 25 a line of figures indicating prices per pound for purchases, and above opening 25 a line of figures indicating amounts to be charged for a predetermined number of pounds of merchandise, a drum having pinions engaging said rack-bars and adapted to rotate within the casing and provided with columns of figures visible at opening 25 to indicate amounts to be charged for merchandise between one pound and the predetermined number of pounds, and with independent columns of figures visible at openings 23 and 24 respectively, to indicate pounds and ounces.

7. In a scale of the character described the combination with the draft-bars and the rack-bars, of an evener pivoted to the draft-bars and carrying an eye 17 and a cross-rod 18 connected to the rack-bars and passing loosely through the eye whereby cramping of the parts is prevented should the evener be tilted out of parallel with the cross-rod.

8. The combination with the draft-bars and the rack-bars having sleeves 19, of an evener pivoted to the draft-bars and carrying at its center an eye 17 and a cross-rod 18 which passes through the sleeves and bears upon the draft-bars and the center of which passes loosely through the eye upon the evener so that cramping of the parts will be prevented and the pull upon the rack-bars will be even at all times.

9. In a scale of the character described the combination with brackets 6 having slots 7 and the draft-bars and rack-bars which pass through said slots, of the evener and spring cross-rod 18 by which the draft-bars and the rack-bars are respectively connected, means for connecting said evener and spring cross-rod and stop-pins 22 in the draft-bars which are adapted to engage the brackets to limit the upward movement of the draft-bars and rack-bars and stop the backward rotation of the drum.

10. In a scale of the character described the combination with a frame, the draft-bars having stop-pins 22 adapted to engage the frame and the rack-bars, of an evener pivoted to the draft-bars and a spring cross-rod connected to the evener and to the rack-bars, said spring cross-rod being adapted to yield when the stop-pins engage the frame and thereby prevent shock to the drum.

11. The combination with the frame, the drum, the rack-bars and the draft-bars having stop-pins 22, of an evener pivoted to the draft-bars and carrying an eye and a spring cross-rod which passes through the eye and is connected to the rack-bars, whereby when the upward movement of the draft-bars is stopped by the engagement of the stop-pins with the frame the backward rotation of the drum is stopped yieldingly.

In testimony whereof I affix my signature in presence of two witnesses.

ALBERT U. SMITH.

Witnesses:
ORLANDO I. ALLEN,
HARRY B. SMITH.